United States Patent
Kneckt et al.

(10) Patent No.: US 9,843,990 B2
(45) Date of Patent: Dec. 12, 2017

(54) ASSOCIATION IN WIRELESS NETWORK (71) Applicant: Nokia Technologies Oy, Espoo (FI)

(72) Inventors: Jarkko Lauri Sakari Kneckt, Espoo (FI); Niko Tapani Kiukkonen, Veikkola (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/417,258

(22) PCT Filed: Sep. 18, 2012

(86) PCT No.: PCT/FI2012/050901
§ 371 (c)(1),
(2) Date: Jan. 26, 2015

(87) PCT Pub. No.: WO2014/044899
PCT Pub. Date: Mar. 27, 2014

(65) Prior Publication Data
US 2015/0282053 A1    Oct. 1, 2015

(51) Int. Cl.
*H04W 48/16* (2009.01)
*H04W 48/20* (2009.01)
*H04W 48/18* (2009.01)
*H04W 72/04* (2009.01)
*H04W 48/14* (2009.01)
(Continued)

(52) U.S. Cl.
CPC ......... *H04W 48/16* (2013.01); *H04W 48/18* (2013.01); *H04W 48/20* (2013.01); *H04W 72/0446* (2013.01); *H04W 48/14* (2013.01); *H04W 88/02* (2013.01); *H04W 88/08* (2013.01)

(58) Field of Classification Search
CPC ..... H04W 48/14; H04W 48/16; H04W 48/18; H04W 48/20; H04W 72/0446; H04W 88/02; H04W 88/08
See application file for complete search history.

(56) References Cited

U.S. PATENT DOCUMENTS 7,565,158 B1 * 7/2009 Aholainen ............ H04L 29/06
                                                    455/41.2
9,277,492 B2 * 3/2016 Juang ................... H04W 48/18
(Continued)

FOREIGN PATENT DOCUMENTS

CN     1685670 A    10/2005
EP     2498551      9/2012
(Continued)

OTHER PUBLICATIONS

International Search Report and Written Opinion received for corresponding Patent Cooperation Treaty Application No. PCT/FI2012/050901, dated May 27, 2013, 10 pages.
(Continued)

*Primary Examiner* — Warner Wong
(74) *Attorney, Agent, or Firm* — Harrington & Smith (57) ABSTRACT

This document relates to a wireless network where an access node may define association limitations to prefer some terminal devices over the other. A terminal device may determine the association limitations on the basis of a frame received from the access node and choose, on the basis of the received frame, whether or not to associate to the access node.

22 Claims, 4 Drawing Sheets (51) Int. Cl.
*H04W 88/02* (2009.01)
*H04W 88/08* (2009.01)

(56) References Cited

U.S. PATENT DOCUMENTS

| | | | | |
|---|---|---|---|---|
| 9,615,373 | B2* | 4/2017 | Wang | H04W 16/30 |
| 2004/0066759 | A1* | 4/2004 | Molteni | H04L 41/048 |
| | | | | 370/329 |
| 2006/0221919 | A1 | 10/2006 | McRae et al. | |
| 2009/0122760 | A1 | 5/2009 | Kim et al. | |
| 2010/0296494 | A1* | 11/2010 | Kanodia | H04L 47/14 |
| | | | | 370/336 |
| 2011/0013533 | A1 | 1/2011 | Bennett | |
| 2011/0261891 | A1* | 10/2011 | Vos | H04L 25/4906 |
| | | | | 375/259 |
| 2012/0076117 | A1* | 3/2012 | Montemurro | H04W 48/16 |
| | | | | 370/338 |
| 2012/0147800 | A1* | 6/2012 | Park | H04W 52/0216 |
| | | | | 370/311 |
| 2013/0039275 | A1* | 2/2013 | Patil | H04W 48/20 |
| | | | | 370/328 |
| 2014/0016612 | A1* | 1/2014 | Montemurro | H04W 8/087 |
| | | | | 370/331 |
| 2015/0092763 | A1* | 4/2015 | Kim | H04W 52/0216 |
| | | | | 370/338 |
| 2015/0103767 | A1* | 4/2015 | Kim | H04W 74/06 |
| | | | | 370/329 |

FOREIGN PATENT DOCUMENTS

| | | |
|---|---|---|
| JP | 2005-244721 A | 9/2005 |
| JP | 2007-266950 A | 10/2007 |
| WO | WO-2004/034648 A2 | 4/2004 |
| WO | 2009091739 | 7/2009 |

OTHER PUBLICATIONS

Anna Pantelidou (Renesas Mobile Corporation) *On The BSS Max Idle Period* 11-12-0376-01-00ah-on-the-bss-max-idle-period. IEEE SA MENTOR. Piscataway, NJ, USA. vol. 802.11ah, No. 1. Mar. 13, 2012 pp. 1-13, XP068038734.

Cai et al., "Differentiated Initial Link Setup", Doc : IEEE 802.11-12/0569, May 2012, pp. 1-21.

Office action received for corresponding Japanese Patent Application No. 2015-532477, dated Mar. 15, 2016, 5 pages of office action and 12 pages of office action translation available.

Yunoki, "AP Operational Status", Doc : IEEE 11-11/0762r0, Jul. 2012, pp. 1-8.

Cai et al., "Differentiated Association Service Provisioning in WiFi Networks", Doc : IEEE 802.11-12/0249r0, Mar. 2012, pp. 1-10.

Lee et al., "Active Scanning Considering Operating Status of Aps", Doc : IEEE 802.11-12/0897r0, Jul. 2012, pp. 1-12.

Yunoki et al., "AP Status Broadcast", Doc : IEEE 11-11/1565r0, Nov. 2011, pp. 1-11.

\* cited by examiner

ASSOCIATION IN WIRELESS NETWORK

RELATED APPLICATION

This application was originally filed as PCT Application No. PCT/FI2012/050901 filed Sep. 18, 2012.

FIELD

The invention relates to the field of wireless communications and, particularly, to association between terminal device and an access point.

BACKGROUND

A terminal device of a wireless communication system may be configured to scan for available access points before initiating a link setup with an access point of a wireless network. The terminal device may scan for messages transmitted by the access points, wherein the messages comprise parameters of the access point.

BRIEF DESCRIPTION

The invention is defined by appended independent claims.
Embodiments of the invention are defined in dependent claims.

LIST OF DRAWINGS

Embodiments of the present invention are described below, by way of example only, with reference to the accompanying drawings, in which.

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
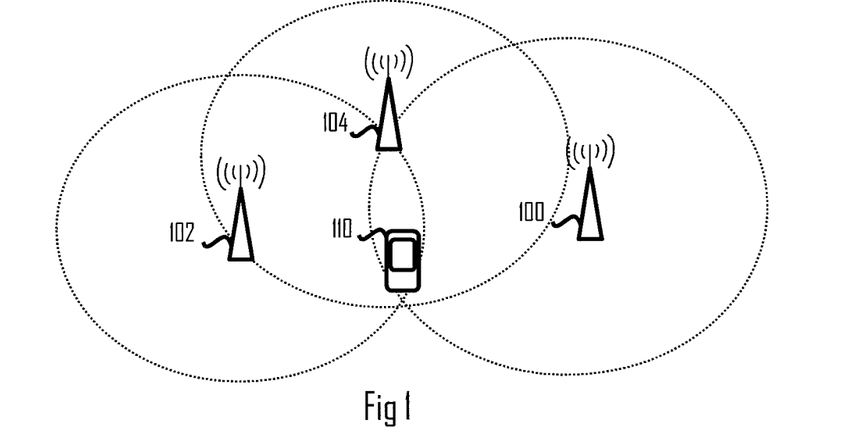
FIG. 1 illustrates an example of a wireless communication scenario to which embodiments of the invention may be applied.

A general wireless communication scenario to which embodiments of the invention may be applied is illustrated in FIG. 1. FIG. 1 illustrates wireless communication devices comprising a plurality of access points (AP) 100, 102, 104 and a wireless terminal device (STA) 110. Each access point 100 to 104 may be associated with a basic service set (BSS) which is a basic building block of an IEEE 802.11 wireless local area network (WLAN). Each access point 100 to 104 may represent a different BSS. The most common BSS type is an infrastructure BSS that includes a single AP together with all STAs associated with the AP. The AP may be a fixed AP or it may be a mobile AP. The APs 100 to 104 may also provide access to other networks, e.g. the Internet. In another embodiment, the BSSs may be connected with each other by a distribution system (DS) to form an extended service set (ESS). An independent BSS (IBSS) is formed by an adhoc network of terminal devices without a controlling access point. While embodiments of the invention are described in the context of the above-described topologies of IEEE 802.11, it should be appreciated that these or other embodiments of the invention may be applicable to networks based on other specifications, e.g. WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by other IEEE task groups, e.g. 802.19 task group 1 (TG1).

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access.

IEEE 802.11ai task group is creating principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

As described above, the BSS may be represented by an AP and one or more STAB connected to the AP or by a plurality of STAB in the case of IBSS. The STA 110 may establish a connection to any one of the APs 100, 102, 104. The connection establishment may include authentication in which an identity of a STA is established in the AP. The authentication may comprise exchanging an encryption key used in the BSS. After the authentication, the AP and the STA may carry out association in which the STA is fully registered in the BSS, e.g. by providing the STA with an association identifier (AID). It should be noted that in other systems terms authentication and association are not necessarily used and, therefore, the association of the STA to an AP should be understood broadly as establishing a connection between the STA and the AP such that the STA is in a connected state with respect to the AP and scanning for downlink frame transmissions from the AP and its own buffers for uplink frame transmissions.

In areas where there are numerous terminal devices present, e.g. in airports and shopping malls, some access points may become overloaded while other access points would have capacity available. An embodiment of the invention provides a method for enabling an access point to set preferences for terminal devices that may associate to the access point. When two neighbouring access points set different preferences, the distribution of the terminal devices to different access points may be improved. The congestion of a radio interface may be a bottleneck and, therefore, the preferences set by the access points may relate to the frame transmissions in the radio interface. In particular, the access point may set association limitations that define timing of frame transmissions when associated to the access point. A terminal device that is associated to the access point is required to comply with the association limitations, if it chooses to associate to the access point. Preliminary notification of the association limitation enables the terminal device to choose whether or not it is able to meet the association limitations.

Figure 2A:
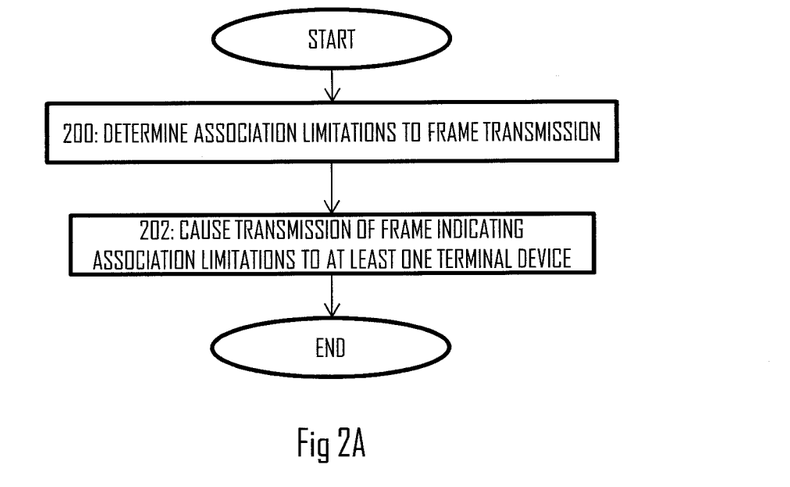
FIGS. 2A and 2B illustrate utilization of association limitations in a terminal device and an access point according to some embodiments of the invention.

FIG. 2A illustrates a flow diagram of an embodiment for setting the preferences in an access node. The access node may be an access point in a wireless network forming the BSS or the ESS, or it may be a non-access-point terminal device in the case of an ad-hoc network. Referring to FIG. 2, the access point determines limitations set by the access node for preferring some terminal device over other terminal devices in block 200. In an embodiment, the association limitations define how frequently frame transmissions shall be carried out when a terminal device is associated to the access node. In another embodiment, the association limitations comprise a maximum idle period for a terminal device that is associated to the access node. In yet another embodiment, the association limitations comprise a maximum association time. In general, the association limitations may define the timing of frame transmissions when associated to the access node. The frame transmissions may refer to uplink and/or downlink frame transmissions. In block 202, the access node carries out transmission of a frame specifying said association limitations to at least one terminal device.

Figure 2B:
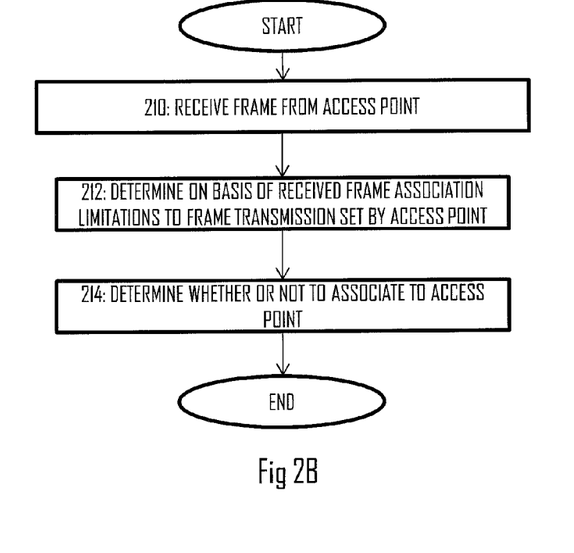

FIG. 2B illustrates the procedure from the viewpoint of the terminal device searching for an access node to which to associate. Referring to FIG. 2B, the terminal device receives the frame from the access node before starting an association procedure towards the access node in block 210. In block 212, the terminal device determines, on the basis of the frame received from the access node, at least one association parameter specifying the association limitations set by the access node. In block 214, the terminal device determines whether or not to associate to the access node based at least partly on said association limitations.

The process of FIG. 2A configures the access node to set the association limitations to prefer some terminal devices over the other. This may be used to balance the distribution of terminal devices between different access nodes, and the access node may also choose the terminal devices that match with the capabilities of the access node. The process of FIG. 2B configures the terminal device to associate to the access node that provides association limitations matching with the capabilities of the terminal device. The above-described embodiment thus enables pairing of access nodes and terminal devices that have similar capabilities with respect to the frame transmissions. Some use cases are described below.

In an embodiment, if a terminal device associates to the access point but cannot meet at least some of the association limitations during the association, the access point may disassociate the terminal device. The access point may provide some flexibility in the requirements to comply with the association limitations, e.g. one-time non-compliance may not yet trigger the disassociation.

In the embodiments described below, the access node is considered to be an access point having features of a base station of a wireless network, e.g. an access point of the IEEE 802.11 network. However, the embodiments are equally applicable to mobile ad-hoc networks without an access point and, in such embodiments, the access point may be replaced by another terminal device serving as the access node. The terminal device(s) may be non-access point terminal devices of the IEEE 802.11 network or another wireless network.

Figure 3:
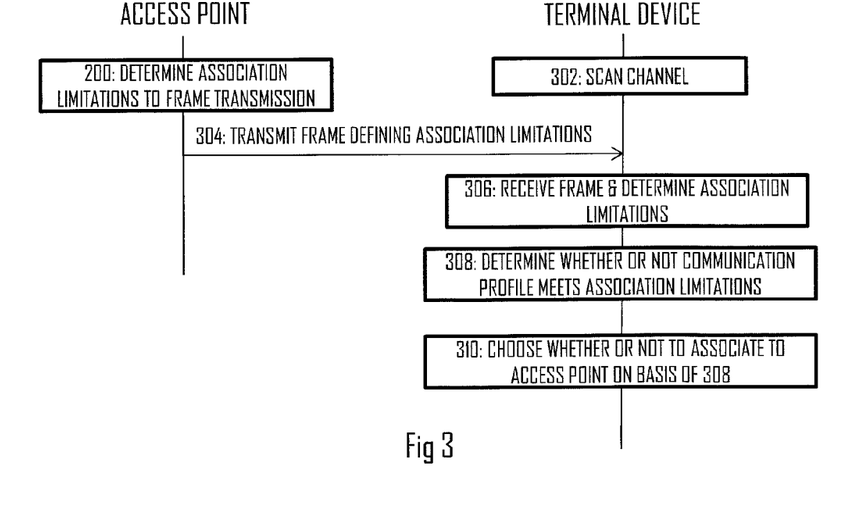
FIGS. 3 and 4 illustrate signalling diagrams for determining and indicating the association limitations according to some embodiments of the invention.
Figure 4:
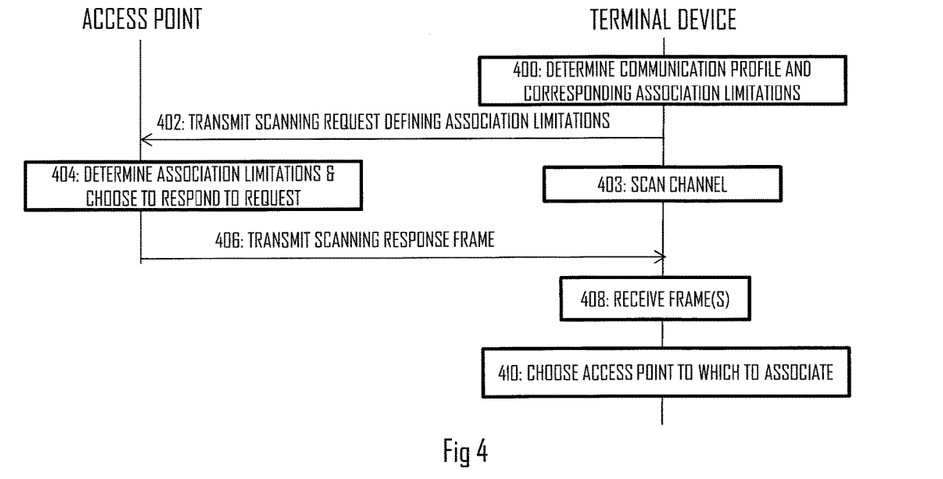

FIGS. 3 and 4 illustrate signalling diagrams of different embodiments for providing the association limitations by the access point and determining the association limitations in the terminal device. In the embodiment of FIG. 3, the association limitations are defined by at least one parameter comprised in the frame transmitted from the access point. In the embodiment of FIG. 4, the terminal device sends a request defining conditions an access point should meet in order to respond to the request, wherein the conditions define the association limitations.

Referring to FIG. 3, the access node determines the association limitations in block 200. The terminal device is searching for an access node to which to associate and is scanning a radio channel for any transmissions from access nodes (block 302). The terminal device may scan for beacon transmissions or other broadcast transmissions or, in general, any frame transmissions comprising discovery information related to access points. In 304, the access point transmits the frame comprising the at least one parameters defining the association limitations. The frame may be at least one of the following frames: a beacon frame, a probe response to a probe request, an authentication response to an authentication request, or a FILS setup response, or any other discovery frame advertising the presence of the access point. A parameter defining the association limitations may be called an association control element. Let us now consider some embodiments for information elements that may be comprised in the association control element with reference to FIG. 5.

Figure 5:
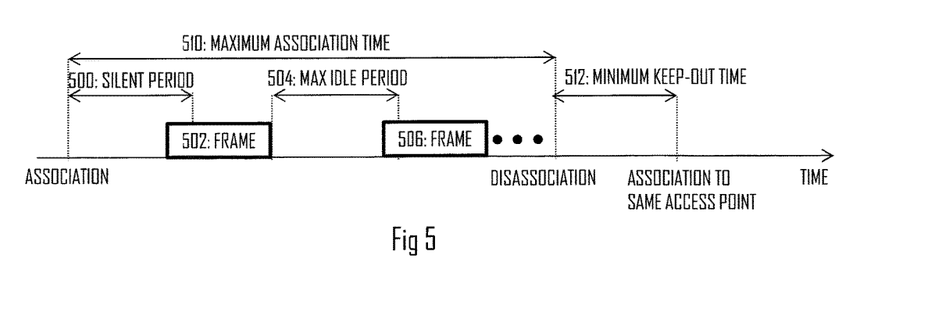
FIG. 5 illustrates embodiments of the association limitations related to timing of frame transmissions during an association according to some embodiments of the invention.

Referring to FIG. 5, the association control element may comprise an initial silent period 500 specifying a maximum time interval allowed for the terminal device to refrain from frame transmissions as counted from the start of the association. The initial silent period may be considered to encompass a time interval measured from the association and during which the terminal device may or may not send a frame to the access point. If the terminal device does not have a frame to transmit to the access point during the initial silent interval, the access point will cause no consequences of the silence. In another embodiment, link maintenance rules may be maintained during the initial silent period and, after the initial silent period, association limitations indicated may be applied. In an embodiment using the IEEE 802.11 specification, the link maintenance rules may be indicated in Max BSS Listening Interval information element and/or in other control elements specifying link maintenance related to the association. The initial silent period 500 may thus be considered as a mercy period during which there are no activity requirements for the terminal device with respect to the frame transmissions. Upon expiry of the initial silent period 500, normal association limitations with respect to the activity of frame transmissions may be applied. Referring to FIG. 5, the terminal device may be required to transmit/receive a first frame 502 before expiry of the initial silent period 500. Otherwise, the access point may initiate the disassociation. The terminal device may use the initial silent period for carrying other functions, e.g. to communicate with another access point or terminal device. The initial silent period may also be used to allow a delay in a higher layer communication at the start of the association. For example, after associating with the access point, the terminal device may open an application layer connection with a network server, e.g. an e-mail server or a web site server. There may, however, be a delay in the response from the network server, e.g. because of congestion in the network server or in the connection between the network server and the terminal device. This may cause that there is no data to be transmitted and/or received at the start of the association. Similarly, the terminal device may have some higher priority operations after the beginning of the association that prevent the frame transmissions. The initial silent period may thus prevent the disassociation caused by unavoidable silence at the beginning of the association. The initial silent period 500 may be defined in determined time units. In some embodiments where the invention is used in the IEEE 802.11 network, the initial silent period may be in units of ten time units (TU), wherein one time unit is 1.024 milliseconds (ms), thus resulting in that the initial silent period is expressed in units of 10.24 ms. The duration of the initial silent period may be fixed or it may be a variable determined by the access point. In the latter case, the length of this information element may be longer to accommodate the value defining the duration of the initial silent period 500 in the frame transmitted by the access point. The information element indicating the initial silent period 500 may also comprise a value that defines that the initial silent period 500 is not in currently applied.

In an embodiment, the association control element comprises a maximum association time 510 defining a maximum duration for the association in determined time units. In some embodiments where the invention is used in the IEEE 802.11 network, the maximum association time may also be in units of ten time units (TU), wherein one time unit is 1.024 milliseconds (ms), thus resulting in that the maximum association time is expressed in units of 10.24 ms. The duration of the maximum association time 510 may be fixed or it may be a variable determined by the access point. In the latter case, the length of this information element may be longer to accommodate the value defining the duration of the maximum association time in the frame transmitted by the access point. The information element indicating the maximum association time 510 may also comprise a value that defines that the maximum association time 510 is not in currently applied. In such a case, the association may last for an arbitrary duration. In the case where the maximum association time is used, the access point may initiate the disassociation upon expiry of the maximum association time (see disassociation in FIG. 5).

In an embodiment, the association control element comprises a maximum idle period 504 specifying a maximum duration for the terminal device to stay idle between frame transmissions. In some embodiment, the terminal device may apply a power-save mode in which it intermittently, periodically or non-periodically, shuts down its radio transceiver to enter a doze state in order to save battery. Accordingly, the AP to which the terminal device is associated is expected to buffer frames addressed to the terminal device in the doze state. The maximum idle period may be used to define a maximum duration allowed for a terminal device to remain in the doze state, and the terminal device may compute a maximum duration for its power-save period from the maximum idle period, e.g. by setting the duration of the power-save period to be shorter than the maximum idle period. The maximum idle period may be defined in determined units. In some embodiments where the invention is used in the IEEE 802.11 network, the time unit may be 1.024 ms (one TU). Furthermore, in the context of the IEEE 802.11. the maximum idle period may be defined in a BSS Max Idle Period field described in IEEE 802.11 specifications. The maximum idle period may also comprise one value for indicating that the terminal device is allowed to use the power-save mode. The maximum idle period may also comprise one value for indicating that the terminal device is not allowed to use the power-save mode. One of these values may be value 'zero' (0) of the BSS Max Idle Period field of the IEEE 802.11 specifications. The access point may set the maximum idle period to match with the duration for how long it stores data addressed to the terminal device in its buffers before transmitting the data or carrying out disassociation as a result of non-compliance with the maximum idle period. For example, if the access point determines to store the data in the buffers for the duration of a determined number of beacon transmission intervals, it may select the maximum idle period to correspond with that number of beacon transmission intervals. The beacon frame may comprise a traffic indication map (TIM) indicating to a terminal device in the power-save mode that the access point has data addressed to the terminal device in its buffers. As a consequence, the terminal device may set its power-save duration to be short enough such that it is able to detect at least one of the beacon transmissions containing the TIM having an association identifier of the terminal device and to receive the downlink frame 506 in time.

In another embodiment, the allowance of the power-save mode is indicated by using another parameter than the maximum idle period. In general, the association control element may comprise a power-save enabling parameters indicating whether or not the terminal device is allowed to use the power-save mode.

In an embodiment, the association control element comprises a minimum keep-out time 512 specifying a duration for the terminal device for refraining from associating with the access point after disassociating from the same access point. The access point may use this parameter to ensure that the terminal device will not associate to it again within the time interval specified by this parameter. The minimum keep-out time is in the embodiment of FIG. 5 calculated from the completion of the disassociation, but it may equally be calculated from the beginning of the previous association and, optionally, from the maximum association time. If the terminal device nevertheless attempts to associate to the access point again within the minimum keep-out time, the access point may reject the association or reassociation request. The minimum keep-out time may also be defined in determined time units. In some embodiments where the invention is used in the IEEE 802.11 network, the minimum keep-out time may also be in units of ten time units (TU), wherein one time unit is 1.024 milliseconds (ms), thus resulting in that the minimum keep-out time is expressed in units of 10.24 ms. The minimum keep-out time may also have a value to indicate that the minimum keep-out time is not applied and that the terminal device may associate to the access point again whenever it chooses to do so.

In an embodiment, the keep-out time is longer than the maximum association time.

In an embodiment, the association control element comprises an estimated duration to association specifying a duration after which the access point accepts a new association. The access point may set a maximum number of terminal devices that may be associated to the access point concurrently. The access point may then evaluate when one of the terminal devices will disassociate from the access point, and the estimated duration to the association may be derived on the basis of the evaluation. In the embodiments where the access point uses the maximum association time, the estimated duration to association may be determined from the duration between present and when the first maximum association time of currently associated terminal devices expires. In other embodiments, the access point may allow temporary association of new terminal devices even the maximum number of terminal devices has been exceeded, and the estimated duration to association may be computed by using an input other than the maximum association time of currently associated terminal devices. It should be appreciated that there are other embodiments for estimating the real or stochastic duration to the availability of the next association. Instead of the maximum number of concurrently served terminal devices, or in addition to it, the access point may choose not to allow new associations for the moment on the basis of its current capacity. For example, the access point may be running at its maximum capacity such that a new connection would degrade the performance of the existing connections, and the access point may choose not to accept new associations for now. It may evaluate when it will have capacity and set the value of the estimated duration to association accordingly. The estimated duration to association may also be represented in determined time units. In some embodiments where the invention is used in the IEEE 802.11 network, the estimated duration to association may also be in units of ten time units (TU), wherein one time unit is 1.024 milliseconds (ms), thus resulting in that the estimated duration to association is expressed in units of 10.24 ms. The estimated duration to association may also have one value for defining that the access point currently accepts new associations, e.g. value 0. The terminal device may use the estimated duration to association to refrain from requesting for the association before this duration has expired or, if the new associations are immediately accepted, it may choose to request for the association immediately.

Table 1 below illustrates an embodiment of the association control element comprising the above-described fields and their respective lengths in octets.

TABLE 1

| Element ID | Length | Max Idle Period | Initial Silent Period | Maximum Assoc. Time | Minimum Keep-out. Time | Estimated Duration to Assoc. |
| --- | --- | --- | --- | --- | --- | --- |
| 1 octet | 1 octet | 2 octets | 2 octets | 2 octets | 2 octets | 2 octets |

Element identifier (ID) may identify the association control element, and the Length may specify the total length of the association control element in octets.

Referring back to FIG. 3, the terminal device detects and receives the frame comprising the association limitations in block 306 and determines the association limitations. In block 308, the terminal device determines whether or not its communication profile matches with the association limitations. Block 308 may comprise determining whether the association limitations indicate that the access point is able to provide a service that complies with current connection requirements of the terminal device. Block 308 may comprise evaluating the association limitation in view of the application requesting for the establishment of the association. The application may set requirements for the duration of the association and/or activity during the association. The duration of the association may be estimated from an estimated amount of the data to be transferred, for example. These requirements may distinguish from quality-of-service requirements and association class (AC) requirements. For example, if the application is a video streaming application requiring association for a long duration, the terminal device may choose to associate to an access point having no maximum association time, for example. On the other hand, if the application requires the association for only a short duration, e.g. an e-mail application updating the e-mails, a single association may have a short duration and the terminal device may choose to associate to an access node that uses the maximum association time.

In an embodiment, the terminal device evaluates whether or not it is able to comply with the association limitations. For example, the terminal device may evaluate its power-save functions with respect to the association limitations. For example, if the battery of the terminal device is low and it is configured to apply power-save features, the terminal device may choose not to associate to an access point that does not allow the power-save mode or has strict activity requirements, e.g. an access point that has set a short maximum idle period or an access point that applies the maximum idle period in general. On the other hand, an access point allowing the power-save mode may be preferred.

In block 310, the terminal device chooses whether or not to associate to the access point on the basis of the evaluation of the association limitation in view of the current capability and/or communication profile of the terminal device. Other criteria may be used as well in block 310. If the terminal device chooses to proceed to association, it may transmit an association request or an reassocation request to the access point. Otherwise, the terminal device may continue scanning for other access points.

FIG. 4 illustrates an embodiment where the terminal devices defines association limitations matching its communication profile and/or capabilities and requests for a notification from access points that meet the association limitations set by the terminal device. Referring to FIG. 4, the terminal device determines its association limitations in block 400. The association limitations defined by the terminal device may be called association level criteria in order to separate from the association limitations set by the access points. The association level criteria may comprise at least some of the same parameters listed above as the association limitations set by the access point, but the terminal device may set values of these parameters as a request. For example, the terminal device may determine minimum requirements for the association limitations that an access node should provide so that the terminal device would associate to the access node. The terminal device may determine the minimum requirements on the basis of the communication profile of the terminal device, e.g. on the basis of an application requesting for the association, remaining battery capacity, etc. For example, if the application is a streaming or conversational application, the terminal device may set a minimum requirement that the access point should not apply a maximum association time. If the terminal device is low on battery, it may set a minimum requirement that the access point should allow power-save mode.

In an embodiment, the terminal device uses as the association level criteria at least partially different parameters than those comprised in the association limitations. However, the access point may be configured to map the parameters of the association level criteria to the association limitations. In an embodiment, the association level criteria may specify more general limitations than the association limitations. Table 2 below comprises an embodiment of an information element comprising the association level criteria that the terminal device may use.

TABLE 2

| Value | Description |
|---|---|
| 0 | All association limitations |
| 1 | Unlimited association |
| 2 | Power-save mode allowed |
| 3 | Time limitations applied |

Referring to Table 2, one value (value 0 in this case) may specify that the terminal device accepts all association limitations. One value (value 1 in this case) may specify that the terminal device requires an association that comprises no association limitations. One value (value 2 in this case) may specify that the terminal device requires that the power-save mode is allowed during the association. One value (value 3 in this case) may specify that the terminal device requests that the association limitations apply limitations related to the timing of frame transmissions, e.g. that the access point applies the maximum association time, the mercy period, and/or the maximum idle period between frame transmissions.

The terminal device may include the association level criteria in a request message transmitted by the terminal device (402 in FIG. 4). The association level criteria may be included in the request message as conditions that cause an access point complying with the conditions to respond to the request. The request message may be a probe request or a generic advertisement request (GAS) or, in general, a scanning request for determining the presence of access points capable of serving the terminal device.

In block 404, the access point compares its association limitations with the association level criteria comprised in the scanning request received from the terminal device in 402. If the association level criteria specify that the terminal device accepts any association limitations, the access point may determine to respond to the scanning request with an appropriate scanning response message, e.g. the probe response or the GAS response. If the association level criteria specify that the terminal device requests for an unlimited association, the access point may determine to respond to the scanning request if it sets no association limitations. In an embodiment, the access point may respond if it uses the initial silent period as the association limitation or corresponding limitations that do not limit the operation of the terminal device during the association. If the association level criteria specify that the terminal device requests for specific association limitations, the access point may determine to respond to the scanning request if the association limitations the access point currently uses complies with the association limitations requested by the terminal device. For example, if the terminal device requests for allowing the power-save mode, the access point may determine the maximum idle period parameter currently in use. If the value of the maximum idle period specifies that the terminal device is allowed to use the power-save mode, the access point may choose to respond. The access point may evaluate the maximum association time and, if the maximum association time is not in use, the access point may choose to respond. If the association level criteria specify that the terminal device requests for association limitations related to the timing of the frame transmissions, the access point may determine to respond to the scanning request if it applies the maximum association time and/or the maximum idle period.

In block 403, the terminal device scans the radio channel for any responses to the scanning request transmitted in 402. The terminal device receives the scanning response message in 406 from the access point and, possibly, in block 408 from at least one other access point, and the terminal device may determine from the mere fact that the access point(s) responded to the scanning request that the responded access points are capable of meeting the association level criteria of the terminal device. The scanning response messages may, however, comprise the parameters defining the association limitations of the respective access points. The terminal device may then select one of the responding access points to which to send an association request (block 410).

Let us now consider some use cases with respect to the use of the association level criteria by the terminal device. The terminal device may determine the application type requesting for the association. For instance, when the application is an internet browsing application, the terminal device may determine to scan for an access point that keeps the device in associated state for no limited time, e.g. does not apply the maximum association time.

If the terminal device has configured an email account that updates every few minutes, the terminal device may determine to scan for an access point that only enables the account update. This kind of access point that applies the maximum association time may be assumed to be faster to discover and to provide a higher throughput, because it may have less terminal devices associated to it simultaneously. It is also probable that such an access point has capacity available to serve the terminal device. The access point may indicate the number of terminal devices currently associated to it in a beacon or probe response frame. The terminal device may then use this information to select an access point that has the lowest number of associated terminal devices or at least may use this information in the selection of the access point in order to prefer an access point with less simultaneous users. If the terminal device determines that the access point(s) has/have too many associated terminal device to offer a sufficient throughput for the terminal device, the terminal device may choose delay its association request until one of the access points disassociates at least some of the terminal devices.

The access point may use the above-described association limitation parameters to indicate what type of applications may be used by devices associated to it. The access point may, for example, select a short maximum association time, e.g. 30 seconds to indicate that the access point is suitable for updating email and social media accounts, but it may not be suitable for a long-term use, e.g. internet browsing or very large data exchange.

In another example, the access point may use the initial silent period to allow a terminal device to operate in any power mode, i.e. in an active mode or in the power-save mode. The terminal device that initiated the association to the access point may have to finish communication with a previous access point and transmit disassociation or connection termination messages to the previous access point, and such communication may be carried out during the initial silent period. When the device may operate in any power mode, the communication with the previous access point may be made simpler.

Some applications may require time to fetch data from a server, for example. If we assume that when the terminal device associates to the access point applying the maximum association time specifying that the terminal device may stay associated to the access point for only a limited time, the terminal device may first authenticate and associate to the access point and, then, issue a request to collect update data for the application. Then, the terminal device may utilize the initial silent period to enter the power-save mode and wait for the update data to be transmitted to the access point. After the initial silent period, the terminal device may return to the active state to receive the data during a service period.

The initial silent period may offer the most optimized power-save mode for a certain time and, after the initial silent period, the terminal device may be forced to operate in an active mode. The active mode may refer to that the terminal device is not allowed to use the power-save mode or, at least, to indicate its availability to the access point more frequently. The higher power consumption encourages the terminal device to only stay associated to the access point for the duration of the initial silent period when the terminal device prefers the power-save mode. The higher power consumption enforced after the initial silent period may be considered as a soft recommendation to limit the duration of the association to the access point, and it may thus be used for a similar purpose as maximum association time. The manner in which the short association is encouraged is, however, non-enforcing and the terminal device may choose to stay associated with the cost of increased power consumption.

In environments where there are multiple access points present, and the number of channels available for use by the access points is high, an internet service operator may dedicate some of the channels for use by the access points that set association limitations according to the embodiments of the invention, while other channels may be used other access points. As another example, the operator may dedicate the access points to operate according to principles of the invention regardless of the channel utilization. By configuring the access points to prefer different types of terminal devices, as determined by their respective association limitations, the operator may improve the uniform distribution of the terminal devices. For example, an aim in dedicating some access points for a short-duration service is to ensure that the users may keep their e-mail accounts updated during a rush hour.

In an example, the access points and the terminal devices may apply association classes that define quality-of-service requirements required of the association on a higher layer, e.g. real-time requirements, throughput, and delay. The association class may be defined by a classification from one (1) to four (4), wherein one sets very loose requirements while four defines high quality-of service requirements. The association class may be used by the access point as one association limitation. In an embodiment, the association limitations may be provided for each association class separately. For instance, the association limitations may be more relaxed for class 1 and very strict to class 4. The terminal device and the access point may negotiate the association class to be used in connection with the association. For instance, if the terminal device operates a real time application, e.g. class 4, the access point may force the terminal device to apply a short maximum idle period. If the terminal device operates a non-real-time application, e.g. class 1, the access point may force the terminal device to apply a long maximum idle period and allow the power-save mode.

The access point may use the association limitations to control its capacity, e.g. by scheduling the associations. The maximum association time may be used to control the duration of each association and, on a higher level, to control the number of associated terminal devices. This may be used to ensure, possibly together with a maximum number of simultaneous associations, that the access point will not become overloaded. The estimated duration to association parameter may be used to plan for future associations, e.g. the access point may beforehand announce when it will have capacity to serve additional terminal devices. This may improve the overall capacity and performance of the access point.

The FILS may enable more frequent link setup with less power consumption and overhead. This enables new service models, including the use of short maximum association duration, for example. In general, the access points may profile themselves to serve specific applications by defining the association limitations to correspond to a frame transmission profile of the preferred applications.

Figure 6:
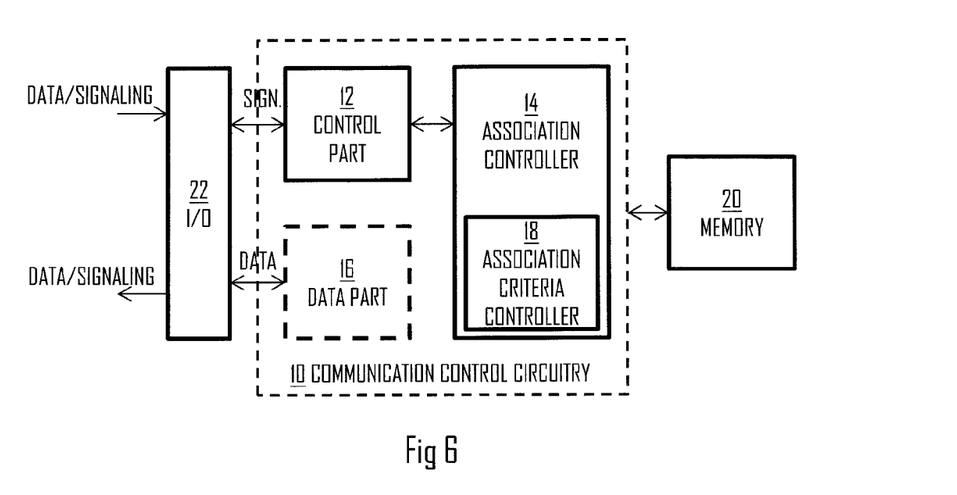
FIGS. 6 and 7 illustrate block diagrams of apparatuses according to some embodiments of the invention.

FIG. 6 illustrates an embodiment of an apparatus comprising means for carrying out the above-mentioned functionalities of the terminal device. The terminal device may comply with specifications of an IEEE 802.11 network or another wireless network, e.g. it may be a STA. The terminal device may also be a cognitive radio apparatus capable of adapting its operation to a changing radio environment, e.g. to changes in parameters of another system on the same frequency band. The terminal device may be or may be comprised in a computer (PC), a laptop, a tablet computer, a cellular phone, a palm computer, or any other wireless apparatus provided with radio communication capability. In another embodiment, the apparatus carrying out the above-described functionalities of the terminal device is comprised in such a wireless apparatus, e.g. the apparatus may comprise a circuitry, e.g. a chip, a processor, a micro controller, or a combination of such circuitries in the wireless apparatus.

Referring to FIG. 6, the apparatus may comprise a communication controller circuitry 10 configured to control wireless communications in the wireless device. The communication controller circuitry 10 may comprise a control part 12 handling control signalling communication with respect to transmission, reception, and extraction of control or management frames including the scanning request messages, scanning response messages, beacon frames, measurement pilot frames, or any other frames transmitted between access points and terminal devices, as described above. The communication controller circuitry 10 may further comprise a data part 16 that handles transmission and reception of payload data when the terminal device is associated to an access point. The communication control circuitry 10 may further comprise an association controller circuitry 14 configured to handle the associations of the terminal device to access points. The association controller circuitry 14 may select an access point to which to associate and configure the control part 12 to carry out the association to that access point. In an embodiment, the association controller circuitry 14 determines the association limitations of at least one access point on the basis of a frame received from the at least one access point and selects an access point complying with a current communication profile of the terminal device, e.g. service requirements of an application requesting for the association. The association controller circuitry 14 may comprise as a sub-circuitry an association criteria controller 18 configured to determine the association criteria on the basis of the communication profile of the terminal device. In an embodiment, the association criteria controller 18 is configured to determine the association level criteria and include the criteria in a request message and cause the control part to transmit the request message. Upon receiving a response to the request from at least one access point, the association controller circuitry 14 may determine that the responding access point meets the association level criteria.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise the memory 20 that stores computer programs (software) configuring the apparatus to perform the above-described functionalities of the terminal device. The memory 20 may also store communication parameters and other information needed for the wireless communications, e.g. communication profiles for different applications executed in the terminal device. The apparatus may further comprise radio interface components 22 providing the apparatus with radio communication capabilities within one or more wireless networks. The radio interface components 22 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor and at least one memory including a computer program code, wherein the at least one memory and the computer program code are configured, with the at least one processor, to cause the apparatus to carry out the functionalities of the terminal device according to any one of the embodiments of FIGS. 2A, 3 to 5. Accordingly, the at least one processor, the memory, and the computer program code form processing means for carrying out embodiments of the present invention in the terminal device.

Figure 7:
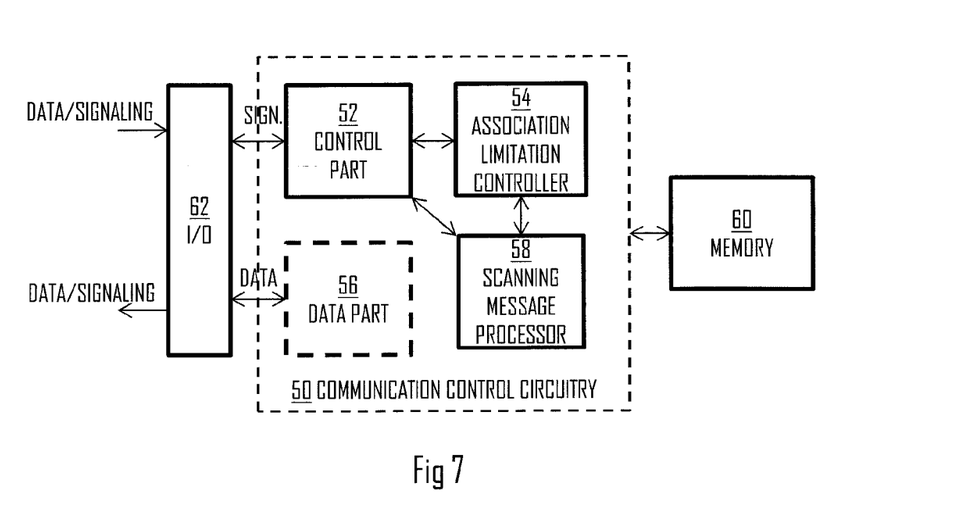

FIG. 7 illustrates an embodiment of an apparatus comprising means for carrying out the above-mentioned functionalities of the access point. The access point may be a wireless device which complies with specifications of an IEEE 802.11 network or another wireless network. The wireless apparatus may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, a base station with routing functionalities, or any other apparatus provided with radio communication capability. In another embodiment, the apparatus carrying out the above-described functionalities of the access point is comprised in such a wireless device, e.g. the apparatus may comprise a circuitry, e.g. a chip, a processor, a micro controller, or a combination of such circuitries in the wireless device.

Referring to FIG. 7, the apparatus may comprise a communication controller circuitry 50 configured to control wireless communications in the wireless device. The communication controller circuitry 50 may comprise a control part 52 handling control signalling communication with respect to transmission, reception, and extraction of control or management frames including the beacon frames, measurement pilot frames, probe response or scanning response frames, and GAS frames, as described above. The communication controller circuitry 50 may further comprise a data part 56 that handles transmission and reception of payload data with terminal devices associated to the access point. The communication controller circuitry 50 may further comprise an association limitation controller 54 configured to determine an association limitation profile for the access point. The association limitation profile may be used to prefer some terminal devices over the other on the basis of the activity level with respect to the frame transmissions. The association limitation parameters may be used to define the association limitation profile, and the association limitation parameters may comprise at least some of the above-described parameters. The association limitation parameters may be used to define the type of applications preferred for association by using physical and/or link layer frame transmission attributes, e.g. the maximum idle period, the maximum association time, the minimum keep-out time.

The communication controller circuitry 50 may further comprise a scanning message processor 58 configured to determine contents of scanning messages transmitted from the access point, e.g. contents of beacon, measurement pilot, and scanning response messages. The scanning message processor 58 may configure the control part 52 to include into any beacon and/or measurement pilot frame at least some of the association limitations. Upon receiving a scanning request from a terminal device, the scanning message processor 58 may determine whether or not the scanning request comprises association level criteria set by the terminal device. If the criteria exist, the scanning message processor may compare the criteria with the current association limitations and determine whether or not the current association limitations comply with the association criteria set by the terminal device. If they comply, the scanning message processor 58 may configure the control part 52 to transmit a response to the scanning request. Otherwise, the scanning message processor 58 may choose not to respond to the scanning request.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) configuring the apparatus to perform the above-described functionalities of the access point. The memory 60 may also store communication parameters and other information needed for the wireless communications within a wireless network of the access point and with other wireless networks. The memory 60 may store the association limitations or sets of association limitations, and the association limitation controller 54 may choose one of the sets at a time. The apparatus may further comprise radio interface components 62 providing the apparatus with radio communication capabilities within its wireless network and/or with other wireless networks. The radio interface components 62 may comprise standard well-known components such as an amplifier, filter, frequency-converter, (de)modulator, and encoder/decoder circuitries and one or more antennas. The apparatus may further comprise a user interface enabling interaction with the user of the device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities of the access point according to any one of the processes described above with respect to FIGS. 2B to 5. Accordingly, the at least one processor, the memory, and the computer program code form processing means for carrying out embodiments of the present invention in the access point.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2 to 5 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   receiving, by a terminal device, a frame from an access node before starting an association procedure towards the access node,
   determining on the basis of the frame received from the access node at least one association parameter specifying at least one association limitation set by the access node, wherein the at least one association limitation comprise at least one of a maximum association time, a minimum keep-out time specifying a duration for the terminal device for refraining from associating with the access node after disassociating from the access node, and an estimated duration to association specifying a duration after which the access node accepts a new association; and,
   determining, by the terminal device, before establishing association with the access node, at least one of whether or not to associate to the access node based at least partly on the at least one association limitation, and
   refraining from requesting an association with the access node based at least in part on the at least one association limitation, wherein establishing association with the access node requires the terminal device to comply with the at least one association limitation set by the access node and the at least one association limitation allows the access node to control a capacity of the access node to simultaneously associate with a plurality of terminal devices.

2. The method of claim 1, wherein the association limitations are set configured to indicate a preference of the access node for some terminal devices that comply with the association limitations over other terminal devices that do not comply with the association limitations.

3. The method of claim 1, wherein the estimated duration to association indicates at least one of the following: whether or not Previously Presented associations are currently allowed, and a duration after which Previously Presented associations will be allowed.

4. The method of claim 1, wherein said at least one parameter specifying the association limitations comprises a maximum association time defining a maximum duration for the association.

5. The method of claim 1, wherein said at least one parameter specifying the association limitations comprises a maximum idle period specifying a maximum duration for the terminal device to stay idle between frame transmissions to the access node.

6. The method of claim 1, wherein said at least one parameter specifying the association limitations comprises a minimum keep-out time specifying a duration for the terminal device for refraining from association again with the access node.

7. A method comprising:
   determining, in an access node, association limitations, wherein the association limitations comprise at least one of a maximum association time, a minimum keep-out time specifying a duration for the terminal device for refraining from associating with the access node after disassociating from the access node, and an estimated duration to association specifying a duration after which the access node accepts a new association; and
   causing transmission of a frame comprising at least one parameter specifying said association limitations from the access node to at least one terminal device, wherein said association limitations are usable by the terminal device, before establishing association with the access node, for determining at least one of whether or not to associate to the access node based at least partly on the at least one association limitation, and
   refraining from requesting an association with the access node based at least in part on the at least one association limitation,
   wherein establishing association with the access node requires the terminal device to comply with the at least one association limitation set by the access node and the at least one association limitation allows the access node to control a capacity of the access node to simultaneously associate with a plurality of terminal devices.

8. The method of claim 7, wherein the association limitations are set by the access node for preferring some terminal device that comply with the association limitations over other terminal devices that do not comply with the association limitations.

9. The method of claim 7, wherein the estimated duration to association indicates at least one of the following: whether or not Previously Presented associations are currently allowed, and a duration after which Previously Presented associations will be allowed.

10. The method of claim 7, wherein said at least one parameter specifying the association limitations comprises a maximum association time defining a maximum duration for an association.

11. The method of claim 7, wherein said at least one parameter specifying the association limitations comprises a minimum keep-out time specifying a duration for a terminal device for refraining from associating again to the access node.

12. An apparatus comprising:
    at least one processor; and
    at least one memory including a computer program code, wherein the at least one memory and the computer program code are configured, with the at least one processor, to cause the apparatus to:
    acquire a frame originating from an access node before starting an association procedure towards the access node;
    determine on the basis of the frame at least one association parameter specifying association limitations set by the access node, wherein the association limitations comprise at least one of a maximum association time, a minimum keep-out time specifying a duration for the terminal device for refraining from associating with the access node after disassociating from the access node, and an estimated duration to association specifying a duration after which the access node accepts a new association; and
    determine, before establishing association with the access node, at least one of whether or not to associate to the access node based at least partly on the at least one association limitation, and
    refraining from requesting an association with the access node based at least in part on the at least one association limitation,
    wherein establishing association with the access node requires the terminal device to comply with the at least one association limitation set by the access node and the at least one association limitation allows the access node to control a capacity of the access node to simultaneously associate with a plurality of terminal devices.

13. The apparatus of claim 12, wherein the association limitations are configured to indicate a preference of the access node for some terminal device that comply with the association limitations over other terminal devices that do not comply with the association limitations.

14. The apparatus of claim 12, wherein the estimated duration to association indicates at least one of the following: whether or not Previously Presented associations are currently allowed, and a duration after which Previously Presented associations will be allowed.

15. The apparatus of claim 12, wherein said at least one parameter specifying the association limitations comprises a maximum association time defining a maximum duration for the association.

16. The apparatus of claim 12, wherein said at least one parameter specifying the association limitations comprises a maximum idle period specifying a maximum duration for the apparatus to stay idle between frame transmissions.

17. The apparatus of claim 12, wherein said at least one parameter specifying the association limitations comprises a minimum keep-out time specifying a duration for the apparatus for refraining from associating again to the access node.

18. An apparatus comprising:
    at least one processor; and
    at least one memory including a computer program code, wherein the at least one memory and the computer program code are configured, with the at least one processor, to cause the apparatus to:
    determine association limitations, wherein the association limitations comprise at least one of a maximum association time, a minimum keep-out time specifying a duration for the terminal device for refraining from associating with the access node after disassociating from the access node, and an estimated duration to association specifying a duration after which the access node accepts a new association; and cause transmission of a frame comprising at least one parameter specifying said association limitations to at least one terminal device, wherein said association limitations are usable by the terminal device, before establishing association with the access node, for determining at least one of whether or not to associate to the access node based at least partly on the at least one association limitation, and refraining from requesting an association with the access node based at least in part on the at least one association limitation, wherein establishing association with the access node requires the terminal device to comply with the at least one association limitation set by the access node and the at least one association limitation allows the access node to control a capacity of the access node to simultaneously associate with a plurality of terminal devices.

19. The apparatus of claim 18, wherein the association limitations are set by the access node for preferring some terminal device that comply with the association limitations over other terminal devices that do not comply with the association limitations.

20. The apparatus of claim 18, wherein the estimated duration to association indicates at least one of the following: whether or not Previously Presented associations are currently allowed, and a duration after which Previously Presented associations will be allowed.

21. The apparatus of claim 18, wherein said at least one parameter specifying the association limitations comprises a maximum association time defining a maximum duration for an association.

22. The apparatus of claim 18, wherein said at least one parameter specifying the association limitations comprises a minimum keep-out time specifying a duration for a terminal device for refraining from associating again to the apparatus.

\* \* \* \* \*